US012510629B2

United States Patent
Emadi et al.

(10) Patent No.: US 12,510,629 B2
(45) Date of Patent: Dec. 30, 2025

(54) TARGET TRACKING USING CIRCULATED TIME DIVISION MULTIPLEXING OF MULTIPLE-INPUT MULTIPLE-OUTPUT RADAR

(71) Applicant: Zadar Labs, Inc., Santa Clara, CA (US)

(72) Inventors: Mohammad Emadi, Santa Clara, CA (US); Ali Mostajeran, Santa Clara, CA (US)

(73) Assignee: Zadar Labs, Inc., Campbell, CA (US)

( * ) Notice: Subject to any disclaimer, the term of this patent is extended or adjusted under 35 U.S.C. 154(b) by 380 days.

(21) Appl. No.: 18/071,512

(22) Filed: Nov. 29, 2022

(65) Prior Publication Data

US 2023/0176188 A1    Jun. 8, 2023

Related U.S. Application Data

(60) Provisional application No. 63/285,635, filed on Dec. 3, 2021.

(51) Int. Cl.
*G01S 7/40* (2006.01)
*G01S 13/50* (2006.01)
*G01S 13/58* (2006.01)

(52) U.S. Cl.
CPC .......... *G01S 7/4056* (2013.01); *G01S 13/505* (2013.01); *G01S 13/583* (2013.01)

(58) Field of Classification Search
CPC ..... G01S 7/4056; G01S 13/505; G01S 13/583
See application file for complete search history.

(56) References Cited

U.S. PATENT DOCUMENTS

| | | | |
|---|---|---|---|
| 9,470,782 B2 | 10/2016 | Millar et al. | |
| 10,921,436 B2 | 2/2021 | Jansen | |
| 11,131,749 B2 | 9/2021 | Loesh | |
| 2013/0016003 A1 | 1/2013 | Stirling-Gallacher et al. | |
| 2016/0131752 A1 | 5/2016 | Jansen et al. | |
| 2017/0131394 A1* | 5/2017 | Roger | G01S 13/343 |

(Continued)

FOREIGN PATENT DOCUMENTS

EP    3015880 B1    2/2020

OTHER PUBLICATIONS

Non-Final Office Action issued Feb. 13, 2025 in U.S. Appl. No. 18/071,495.

(Continued)

*Primary Examiner* — Robert W Hodge
*Assistant Examiner* — Helena H Seraydaryan
(74) *Attorney, Agent, or Firm* — UTULAW PC

(57) ABSTRACT

A phased array frequency-modulated continuous-wave (FMCW) radar system configured to transmit, using a plurality of antennas, a plurality of chirps, wherein each chirp within the plurality of chirps includes at least one temporal characteristic, and wherein the at least one temporal characteristic is pseudo-random for a portion of the plurality of chirps, to receive, using the plurality of antennas, a plurality of chirp reflections off one or more targets, to create, using a mixer, an intermediate frequency based on the plurality of chirps and the plurality of chirp reflections, and to determine, based on the intermediate frequency and the at least one temporal characteristic, a target attribute associated with the one or more targets.

18 Claims, 9 Drawing Sheets

(56) References Cited

U.S. PATENT DOCUMENTS

2018/0348343 A1* 12/2018 Achour ............... H01Q 1/364
2020/0292663 A1    9/2020  Bai et al.

OTHER PUBLICATIONS

Non-Final Office Action issued Jan. 3, 2025 in U.S. Appl. No. 18/071,525.
Kishigami et al., "20 Maximum Likelihood Angle Estimation for MIMO Radar with Unequally Spaced L-shaped Arrays," 2018 15th European Radar Conference (Eu RAD), Madrid, Spain, 2018, pp. 130-133 (Year 2018).
Tayem et al., "L-shape 2-dimensional arrival angle estimation with propagator method," in IEEE Transactions on Antennas and Propagation, vol. 53, No. 5, pp. 1622-1630, May 2005 (Year: 2005).
Di Serio et al., "2-D MIMO Radar: A Method for Array Performance Assessment and Design of a Planar Antenna Array," in IEEE Transactions on Antennas and Propagation, vol. 68, No. 6, pp. 4604-4616, Jun. 2020 (Year: 2020).

* cited by examiner

TARGET TRACKING USING CIRCULATED TIME DIVISION MULTIPLEXING OF MULTIPLE-INPUT MULTIPLE-OUTPUT RADAR

BACKGROUND

Conventionally, an FMCW (Frequency Modulated Continuous Wave) radar has been used as a means for knowing location of a target and the velocity of a target. In a conventional FMCW radar, a receiving signal is mixed with the same FMCW signal as a transmitting signal, whereby a baseband signal is generated. The range of the target is typically estimated form the baseband signal frequency. The velocity of the target is detected from the Doppler shift component of the baseband signal. The angle of arrival of the target is typically estimated from the baseband signal frequency.

A MULTIPLE-INPUT MULTIPLE-OUTPUT (MIMO) radar system has been proposed to improve detection resolution performance. This MIMO radar system transmits signals to respective antennas, so that it is possible to improve resolution performance and obtain a high-resolution image.

MIMO radar systems often require a large number of transmitters (TX) and receivers (RX). This creates an issue of narrow Doppler ambiguity. Although MIMO radars are extremely useful, the requirements for proper usage may be high. Accordingly, presented herein are improved systems and methods associated with circulated time division multiplexing of multiple-input multiple-output radars.

BRIEF DESCRIPTION OF THE DRAWINGS

The drawing figures depict one or more implementations in accordance with the present teachings, by way of example only, not by way of limitation. In the figures, like reference numerals refer to the same or similar elements. Furthermore, it should be understood that the drawings are not necessarily to scale.

SUMMARY

Figure 1:
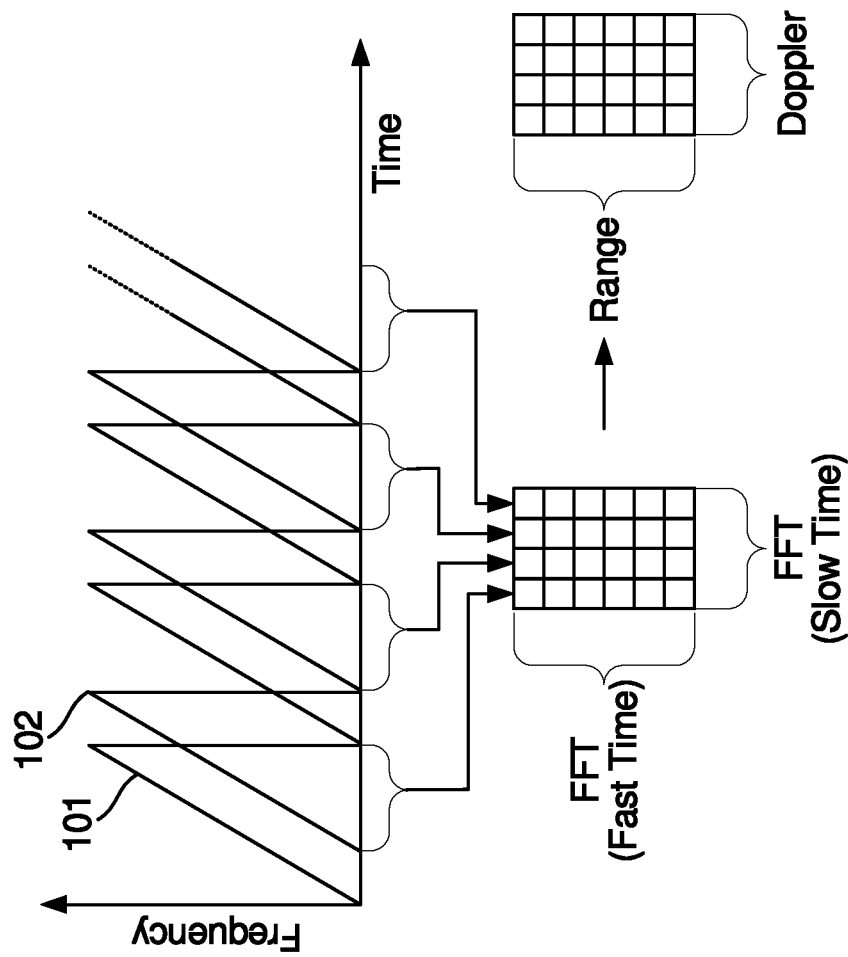
FIG. 1 is a conceptual illustration of a transmitted and received chirp plotted with respect to frequency and time.

Generally, in MIMO radars, the transmit antennas transmit FMCW sequences in a way that guarantees their orthogonality. At each receive antenna, the contribution of each transmit antenna is extracted by exploiting waveform orthogonality. To keep orthogonality the system needs to use different domains. Thus, the system may interleave different transmission over time between different transmit antennas. However, this can create issues, such as, for example, for a moving target with a velocity of v, the switching delays of the transmit antennas introduce a target phase migration from chirp to chirp. If the system does not compensate for this phase, the array pattern will be distorted and increases the sidelobe levels and in some cases wrong direction of arrival estimation.

To solve this problem the system needs to estimate the doppler of the target first and then compensate for it. Accordingly, the system needs to have non-coherent detection first which will reduce the detectability performance of the system as well. Another potential issue relates to doppler ambiguity, which comes from the nyquist theorem and determines a max repetition frequency of the chirps. As can be seen the doppler ambiguity will be reduced if the system uses more MIMO antennas. To solve this problem one can use several different techniques mainly based on non-uniform sampling. Potential solutions may involve, using extended doppler by BF on other possible velocities (e.g., $+-2v_{max}$), disambiguous doppler ambiguity using the Chinese remainder theorem, and non-uniform sampling. If the system uses non-uniform sampling it can increase the ambiguity and remove the effect of M, where M is the number of MIMO Tx antenna elements. In that case the system needs to have randomness on PRI on each Tx over time see FIG. 5B. The main problem of this technique is the fact that the system cannot have any two samples in the doppler domain whose distance is around PRI, so the issues of doppler ambiguity remain. One potential solution could be using rotated Txs number as well to the system FIG. 5C.

To do doppler processing on this case the system can use several different techniques, such as, interpolation. If the system assumed five TX-MIMO it can be seen that $$v_{max} = \frac{\lambda}{4 \times PRI \times 1.1}.$$

even with MIMO the max velocity ambiguity can be increased to Another option may be interpolation on random rotated interleaved TDM-MIMO. The main issue of interpolation is the system needs at least 10 dB SNR before doppler processing. Also, the system cannot achieve better than 20 dB (Dynamic Range) DR at the output of (Doppler-Processing) DP. However, using a norm minimization (e.g., L1 or L2) with regularization technique, can be used here to reduce computational burden.

MIMO (Multiple-Input Multiple-Output) radar is capable of transmitting FMCW beam patterns for operation in which different Transmitter (Tx) antenna elements must have orthogonality for coherent beamforming. For each antenna element, the contribution from each Tx antenna element is extracted by exploiting the waveform orthogonality. Different domains can be used to maintain orthogonality between Tx antenna elements. Interleaved Time-Division-Multiplexing MIMO (TDM-MIMO) is one such approach to maintain orthogonality. (FIGS. 5A, 5B, 5C, and 5D). TDM-MIMO inherently will have increased doppler folding and degraded doppler ambiguity due to the increase in sampling interval proportional to the number of MIMO antenna elements. Switching delays between the MIMO antenna elements typically introduce a target phase migration from chirp to chirp (or pulse to pulse). Accurate doppler estimation is critical in compensating for the phase migration as seen in the following formula: $\Delta\Phi=2\pi f_d m \Delta t$ where, $\Delta\Phi$, target phase migration, $f_d$ is doppler frequency, m is index of the MIMO Tx antenna element, $\Delta t$ is time difference between chirps.

The Pulse Repetition Interval (PRI), or sometimes known as the Chirp Repetition Interval (CRI), is the interval in which a signal is sampled. In some cases, the PRI or CRI may be referred to as the Pulse Repetition Frequency (PRF), or Chirp Repetition Frequency (CRF), where;

$$PRF = \frac{1}{PRI} \text{ or, } CRF = \frac{1}{CRI} \text{ and, } R_{max} = \frac{c}{2 \times PRF}$$

where, $R_{max}$, is the maximum detection range. For unambiguous sampling, in the case of doppler, it is recommended to heed the Nyquist Theorem for each Tx antenna element, where the maximum measurable doppler is equal to $$f_{d_{max}} = \pm \frac{PRF}{2}$$

and where the maximum range-rate is equal to $$v_{d_{max}} = \pm \frac{\lambda \times PRF}{4}$$

where, $\lambda$, is the wavelength. In the case of TDM-MIMO however, the maximum range-rate is $$v_{d_{max}} = \pm \frac{\lambda}{4 \times PRI \times M}$$

where, M is the number of MIMO Tx antenna elements.

Accordingly, the following method based on non-uniform signal sampling reduces doppler folding and increases doppler ambiguity performance. Let us assume the system have M MIMO Tx antenna elements. The relationship between the maximum range-rate, and PRI is as follows $$v_{d_{max}} = \pm \frac{\lambda}{4 \times PRI \times M}.$$

Moreover, the non-uniform operation will reduce the negative effects associated with having a large number of transmitting antenna elements, M and thus effectively improves the doppler ambiguity performance of the system.

In the case of non-uniform PRI, the system will randomize and use a non-uniform PRI for signal sampling for, $PRI_{i,j}$ where, i is the associated Tx antenna element and J is the associated chirp (pulse) number, each $PRI_{i,j}$ will have a randomized appropriate value. In the case of non-uniform Tx, the system will randomize the Tx antenna element sequence within the chirp (pulse) for non-uniformity of signal sampling. In the case of non-uniform Tx and PRI, the system will randomize the Tx antenna element sequence within the chirp (pulse) and use a randomized, non-uniform PRI.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Using radar systems to track targets moving through an area is well understood and has been utilized for years. However, current systems suffer from low doppler ambiguity, which is introduced by target phase migration from chirp to chirp. The target phase migration results in folding of the velocity, which could result in a wrong target speed as well as degrading the direction of arrival estimation. To solve this problem, discussed herein are various systems and methods that can estimate a Doppler of a target and then determine a compensation value for the estimated Doppler. The compensation value addresses Doppler ambiguity.

Accordingly, discussed herein are systems and methods that utilize non-uniform sampling to reduce Doppler folding and increase doppler ambiguity. As discussed in greater detail below, a non-uniform sampling operation will improve the doppler performance of the system in a MIMO Radar.

An FMCW waveform, also referred to herein as a "chirp," is a complex sinusoid whose frequency increases linearly with time t $\varepsilon$ [0, T], (i.e., $f_T(t)=f_c+(B/T)t$), where B is the signal band-width and $f_c$ is the carrier frequency. Typically, FMCW radar transmit chirps in a periodic fashion, with a period referred to as the pulse repetition interval or PRI. The frequency of an FMCW signal through multiple periods (i.e., with a PRI equal to T), is shown in FIG. 1.

Specifically, FIG. 1 illustrates a transmitted chirp 101 and received chirp (i.e., the echo chirp) 102 plotted with respect to frequency and time. The target echo at the radar receiver contains a delayed and attenuated copy of the transmitted chirp. For a target at range R, moving with a radial speed of v, the delay equals x=(2(R+vt))/c, where time t spans multiple periods and c is the speed of light. The received signal is mixed with the transmitted chirp, which results in a complex sinusoid known as the beat-signal. The beat-signal frequency equals $f_b=f_R+f_D$, where $f_R=2RB/(Tc)$ is the range frequency and $f_D=(2v/c)f_c$ is the Doppler frequency. The process of obtaining the beat-signal is implemented in the radio frequency domain by a mixer, followed by a bandpass filter (BPF) with the maximum cutoff frequency $f_b^{max}$; the latter filter is used to remove signals with frequencies outside the band of interest, which also places a limit on the maximum detectable range.

The estimation of the beat-signal frequency is implemented in the digital domain, after the sampling of the beat-signal. The time during one period or chirp is usually referred to as the fast time, while the time across multiple periods or chirps is referred to as the slow time. Thus, if we sample the beat-signal and put the samples of each chirp in the columns of a matrix shown in FIG. 1, the row indices of that matrix correspond to the fast time and the column indices to the slow time.

However, issues may still exist for specific use cases. For example, when attempting to track a moving target with a velocity of v, the switching delays of the transmission antennas can introduce a target phase migration from chirp to chirp, which is defined as $\Delta\Phi=2\pi f_d m\Delta t$. Where $f_d$ is the Doppler frequency and $\Delta t$ is the time difference between MIMO transmissions, and m is the index of the 'mth' transmitter. Generally, some level of compensation is required for this phase array pattern because it may be distorted, which can result in some grating lobes and in some cases indicate an incorrect direction of arrival estimation. As discussed in detail herein, to estimate the direction of the arrival accurately the Doppler of the target needs to be estimated and then compensated for. In some implementations, as discussed herein, the solution may involve using a non-coherent detection method first, which will reduce the detectability performance of the system.

Accordingly, Doppler ambiguity is a major hurdle when creating and/or implementing MIMO based radar systems. As would be understood by one of ordinary skill in the art, Doppler ambiguity can be defined by the Nyquist theorem and the max repetition frequency of the chirps. Based on the Nyquist theorem, the maximum unambiguous Doppler that can be detected is equal to $$v_{max} = \frac{\lambda}{4*PRI*M},$$

where PRI shows the repetition time intervals of chirps and M represents the whole number of transmitted MIMO antennas. Accordingly, the Doppler ambiguity may be increased if we use fewer MIMO antennas. However, this is not an ideal solution as it will degrade the location estimation capabilities of the radar. Discussed herein are various implementation systems and methods that solve this problem using non-uniform sampling.

Figure 2:
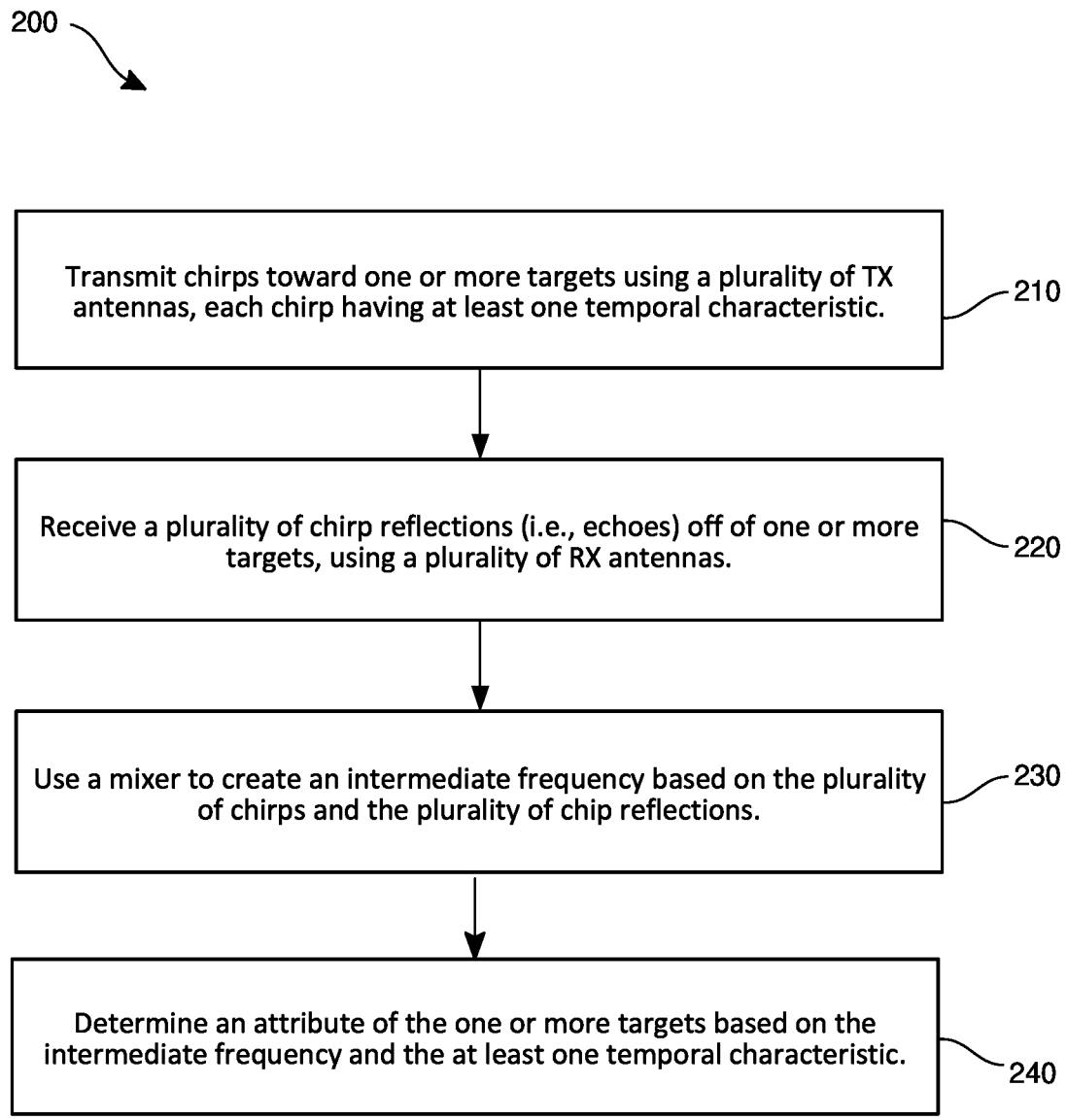
FIG. 2 is a flow diagram illustrating an implementation of a process for using a phased array frequency-modulated continuous-wave (FMCW) radar system.
Figure 3:
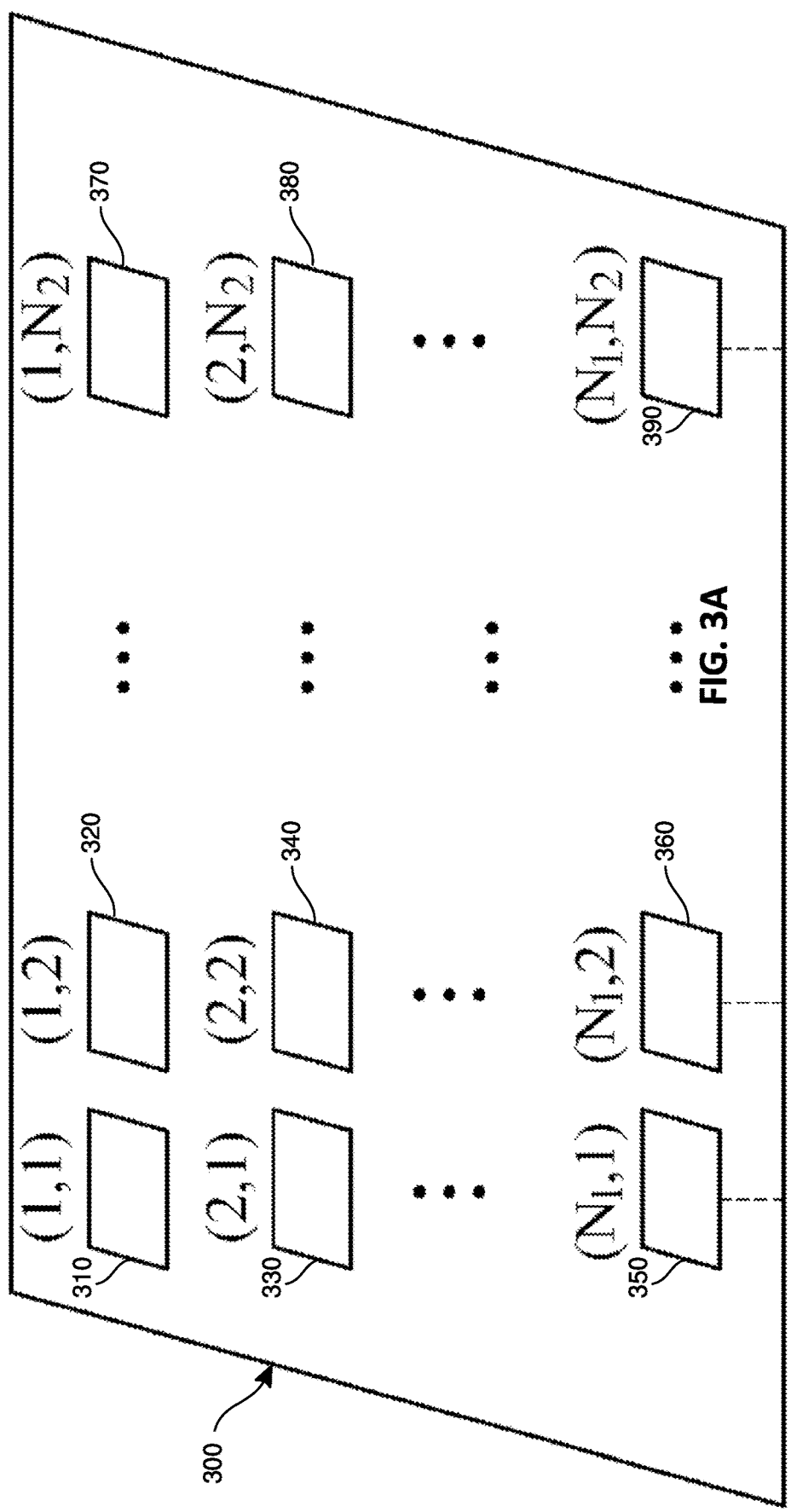
FIG. 3 is a conceptual diagram illustrating an example antenna array.

Referring to FIG. 2, in some implementations, a plurality of chirps may be transmitted toward one or more targets using a plurality of transmission antennas (Step 210). The transmission of the plurality of chirps and the reception of the plurality of chirp reflections may have a pulse repetition interval (e.g., $-f_{D1}$ to $+f_{D1}$). Referring briefly to FIG. 3, an example implementation of an antenna array is shown. In some implementation, and as shown, an antenna array structure may be a planar antenna array 300. In a further implementation, the planar antenna array 300 may include a plurality of antennas (e.g., 310, 320, 330, 340, 350, 360, 370, 380, and 390) arranged in an $n_1 \times n_2$ matrix, as shown. As should be understood by one of ordinary skill in the art, the array may comprise any known configuration of antenna. Thus, although a planar array is shown in FIG. 3, and used herein as an exemplary implementation, it should be understood that other existing antenna array styles may also be implemented.

Returning again to FIG. 2, in some implementations, the transmitted chirps may have at least one temporal characteristic (Step 210). For example, in some implementations, the at least one temporal characteristic may include data that identifies which of the plurality of antennas originated each of the plurality of transmissions. This may be performed using any number of methods, such as, for example, having each antenna associated with an identification tag or method (e.g., as shown in FIG. 3 [1,1], [1,2] . . . [1,$N_2$]), and identifying and/or recording the transmission sequence of the antennas (e.g., [1,3], [2,2], [4,1], [3,2], etc.). Thus, in some implementations, the system may be able to determine the transmission sequence of the chirps.

In a further implementation, the at least one temporal characteristic may include information and/or data corresponding to a pulse duration. The pulse duration may be uniform or pseudo-uniform across the plurality of antennas. Furthermore, the pulse duration may vary from chirp to chirp according to a known or predetermined characteristic(s).

In another implementation, one or more of the temporal characteristics may be pseudo-random. Thus, a portion of the temporal characteristics (e.g., the information regarding which of the plurality of antennas originated each of the plurality of transmissions) may be random or pseudo-random. Alternatively or additionally, a portion of the temporal characteristics such as the pulse duration may be random or pseudo-random.

Once at least one chirp has been transmitted (Step 210), the system may receive, using a plurality of antennas, a plurality of chirp reflections (i.e., echoes) off one or more targets (Step 220). As should be understood by one of ordinary skill in the art, the original chirp travels away from the transmitting antenna until it contacts an object, (e.g., the target) and a portion of that chirp is reflected to the receiving antenna(s). A mixer is then used to create an intermediate frequency based on the plurality of chirps and the plurality of chirp reflections 230.

Figure 4:
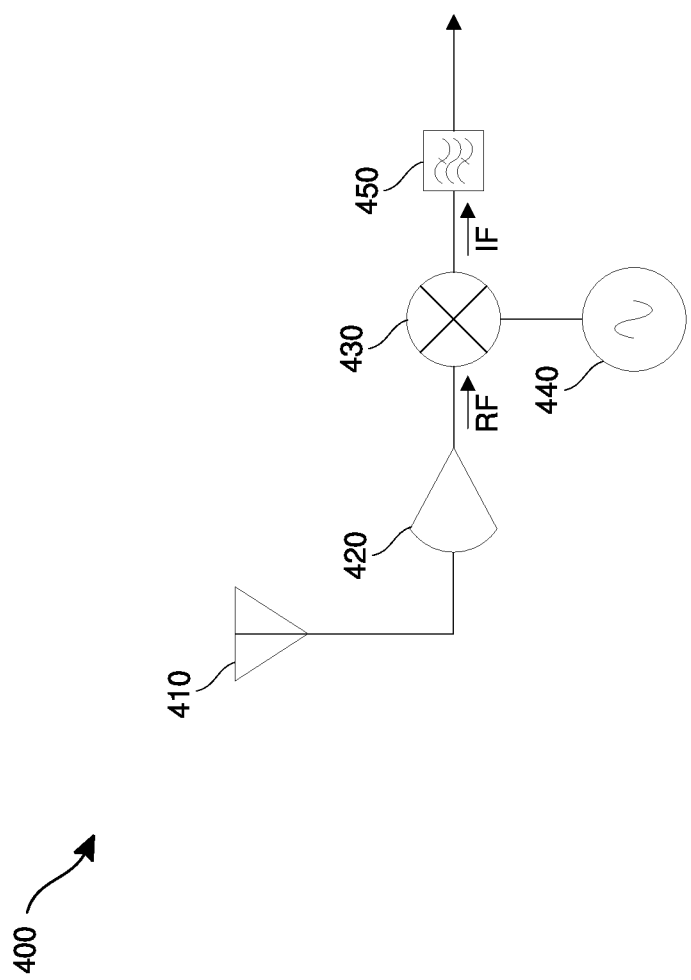
FIG. 4 is a conceptual diagram illustrating an example radio frequency conversion using a mixer.

Referring briefly to FIG. 4, an example implementation system 400 is shown having a receiving antenna 410, which as discussed herein receives the echoes or chirps that are reflected off the target object. In some implementations, and as shown, once received, the signal may be passed through an amplifier 420 (e.g., a low-noise amplifier) and then fed to Radio Frequency (RF) mixer 430. The RF mixer 430 may then use a local oscillation signal 440 to convert the RF to the Intermediate Frequency (IF). In a further implementation, once the IF is generated, it may be filtered through a band pass filter (BPF) 450.

For a moving target with a velocity of v, the time delays between the transmission antennas introduce a target phase migration from chirp to chirp, which can be defined as $\Delta\Phi=2\pi f_d m \Delta t$, that $f_d$ is the Doppler frequency, $\Delta t$ is the time difference between transmissions, m is the index of the 'mth' transmitter. In current systems there are no efficient ways of compensating for the phase migration, which causes the phase array to be distorted and results in grating lobes and in some a completely erroneous direction of arrival estimation. To solve this issue, the implementations disclosed herein may estimate the Doppler of a target first and then compensate for it.

However, as discussed herein, when estimating a Doppler of a target, the primary issue is Doppler ambiguity. As discussed above, Doppler ambiguity can be determined based on the Nyquist theorem as $v_{max}=\lambda/4*PRI*M$, where PRI shows the repetition time intervals of chirps and M represents the whole number of transmission antennas. The Pulse Repetition Interval (PRI) or sometimes known as the Chirp Repetition Interval (CRI) is the interval in which a signal is sampled. In some cases, this is referred to as the Pulse Repetition Frequency (PRF) or Chirp Repetition Frequency (CRF), where; PRF=1/PRI, CRF=1/CRI, and $R_{max}=c/2*PRF$, where $R_{max}$ is the maximum detection range. As can be seen, according to the Nyquist theorem, the Doppler ambiguity will be reduced if more Tx antennas are used. However, as noted, this leads to extremely large and overly costly radar systems. Thus, disclosed herein are methods to address and improve Doppler ambiguity, specifically using non-uniform sampling.

Due to the increase in the signal sampling interval, which is proportional to the number of MIMO transmitting antenna elements, typical time division multiplexing (TDM) of MIMO radars is inherently susceptible to increased doppler folding and degraded doppler ambiguity. Thus, disclosed herein, are systems and methods for non-uniform signal sampling, which can reduce any potential doppler folding, while also increasing doppler ambiguity performance.

Figure 5A:
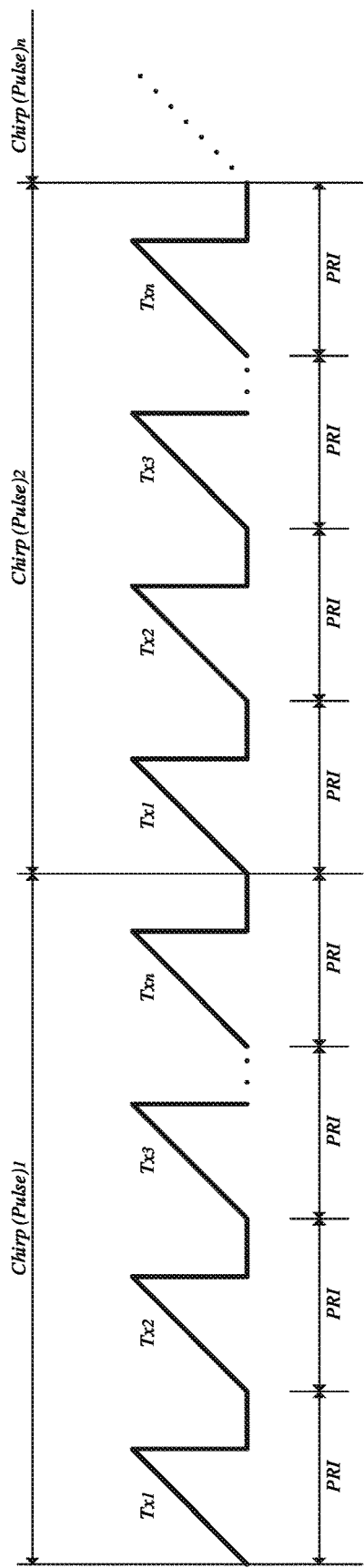
FIGS. 5A, 5B, 5C, and 5D show a graphical representation of various conceptual solutions to Doppler ambiguity.
Figure 5B:
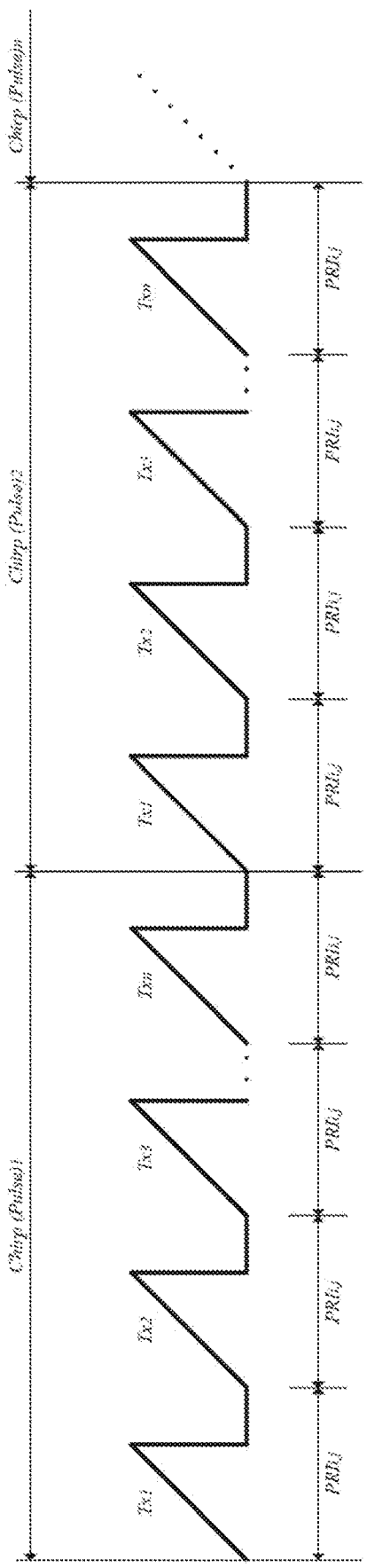

Referring now to FIGS. 5A and 5B, in some implementations, as noted above, non-uniform sampling can improve the ambiguity. The system shown in FIG. 5A may randomize and use a non-uniform $PRI_{i,j}$ for signal sampling, where i is the associated transmission antenna and j is the associated chirp (i.e., pulse) number. Accordingly, each $PRI_{am}$ may have a randomized appropriate value. FIG. 5B shows an example implementation in which the transmission antenna sequence is randomized within the chirp for non-uniformity of signal sampling.

Figure 5C:
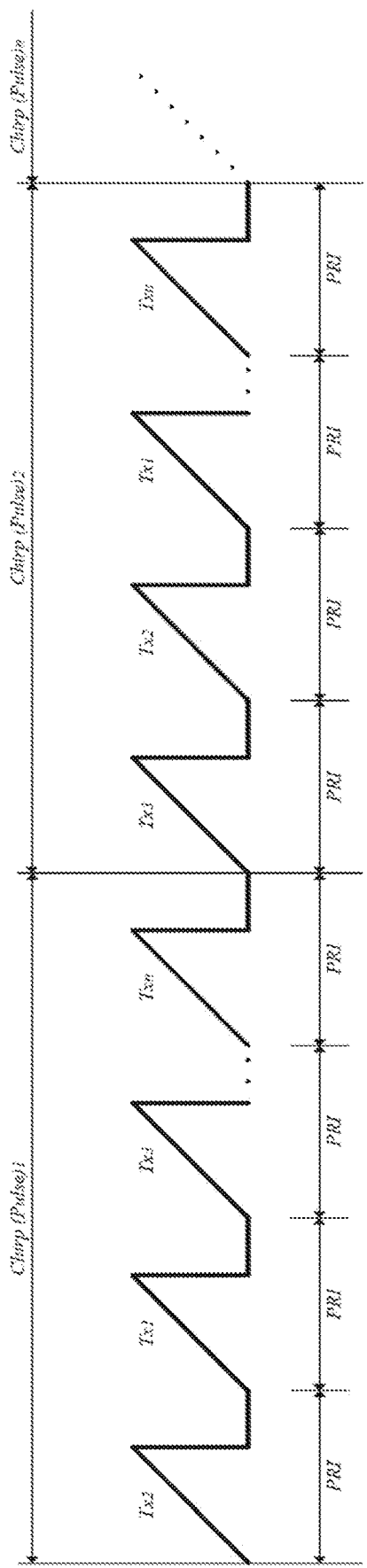
Figure 5D:
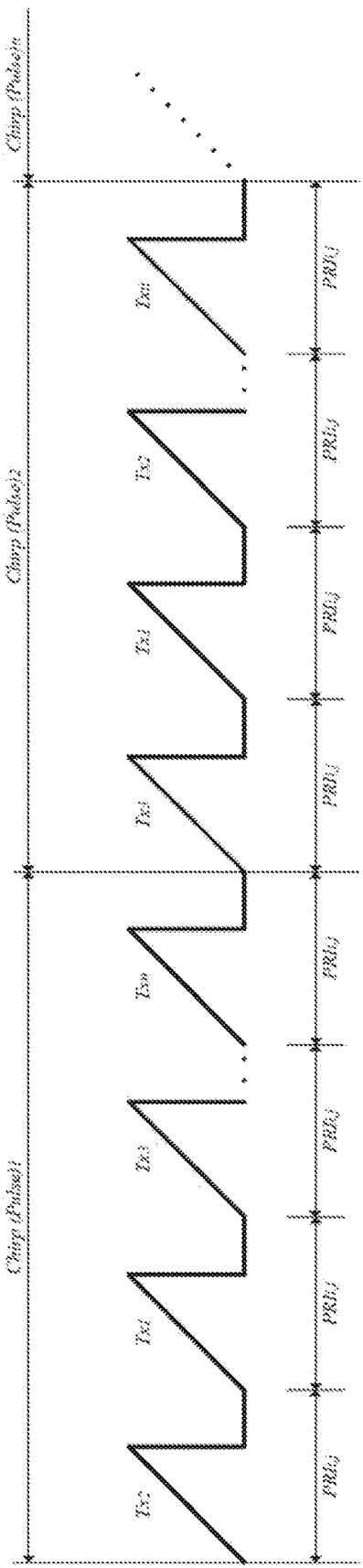

Referring now to FIG. 5C, in some implementations, the transmission antenna element sequence may be randomized, and a non-uniform sampling of PRI is used for signal sampling. It should be further understood that the individual concepts show in FIGS. 5A, 5B, and 5C, and described above, are not mutually exclusive. Thus, in some implementations, it may be possible to utilize a combination of one or more of the above concepts to create a wave in which two samples in the Doppler domain for a specific Tx have a distance that is close to or approximately the same as the PRI.

Figure 6:
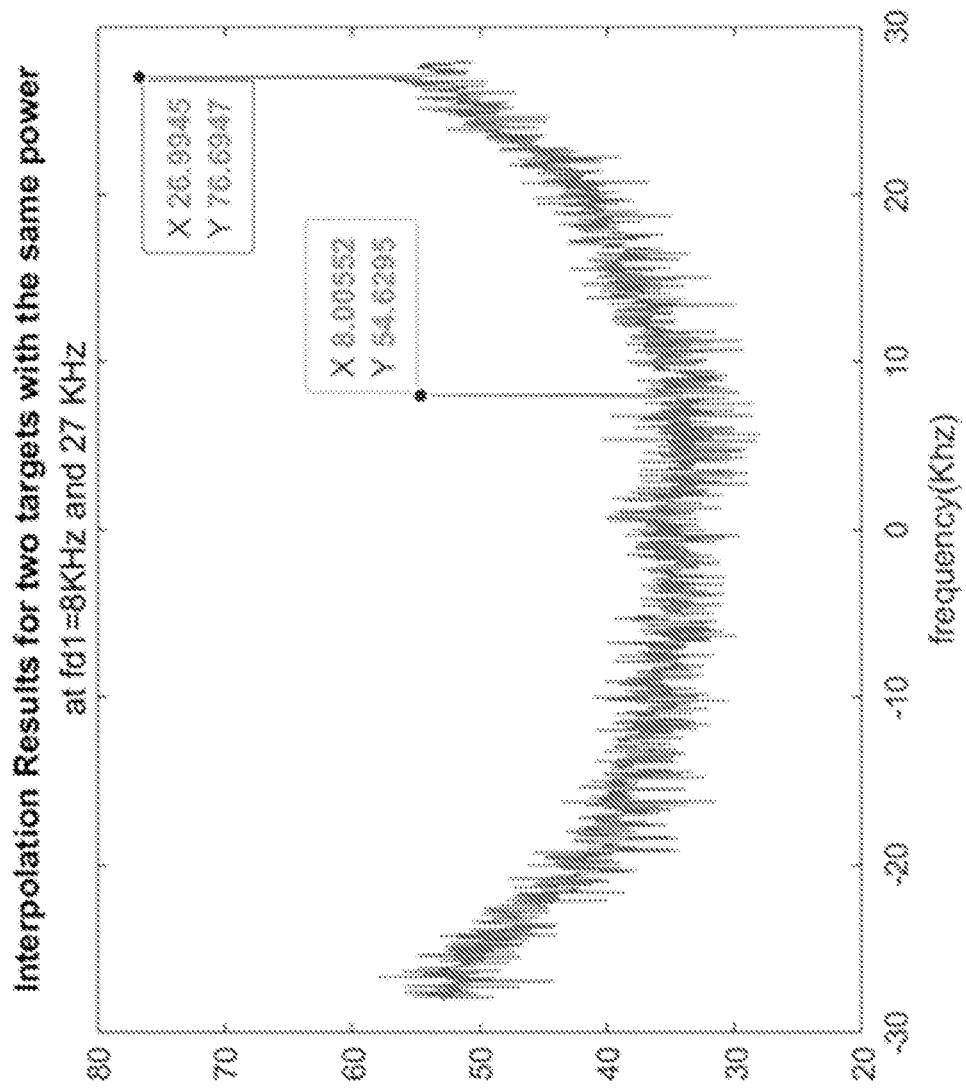
FIG. 6 is an illustrative graphical plot of interpolation results for two targets with the same power.
Figure 7:
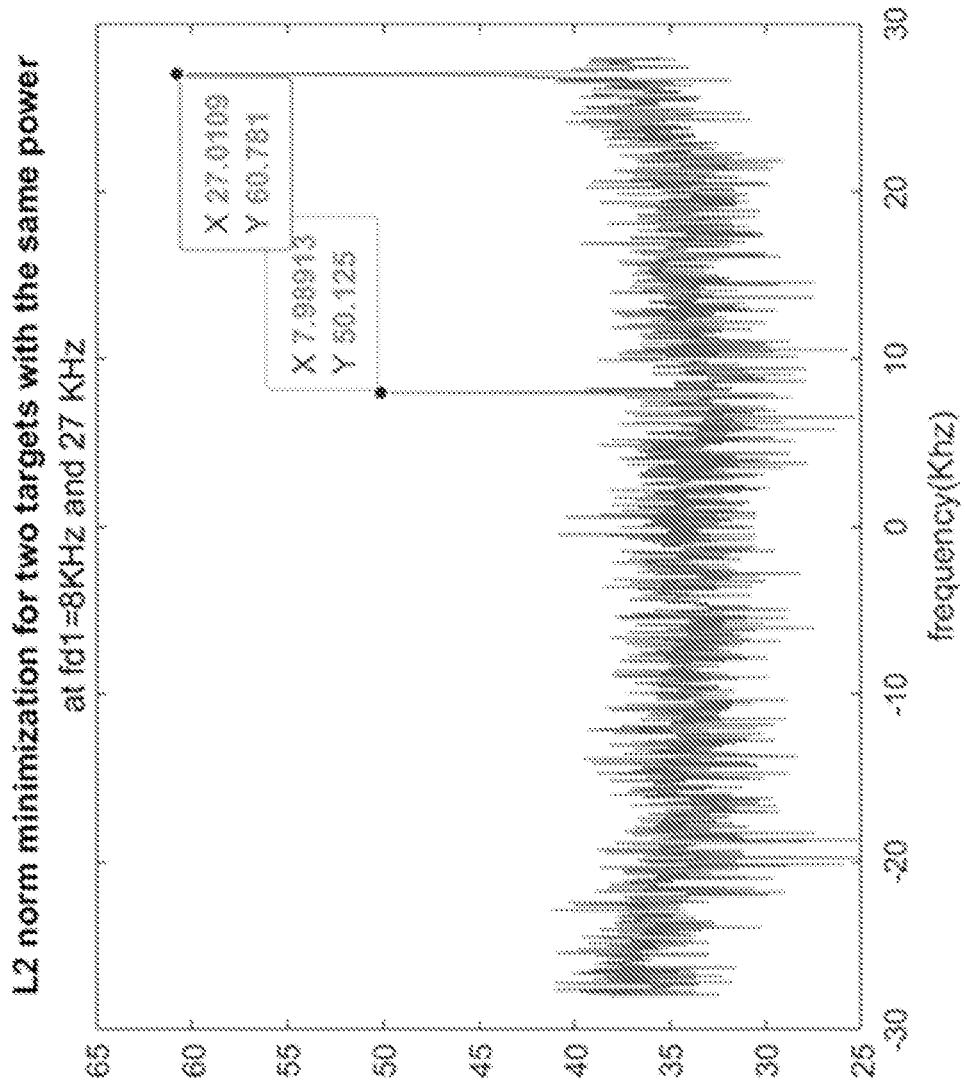
FIG. 7 is an illustrative graphical plot of an L2 normalization minimization for two targets with the same power.
Figure 8:
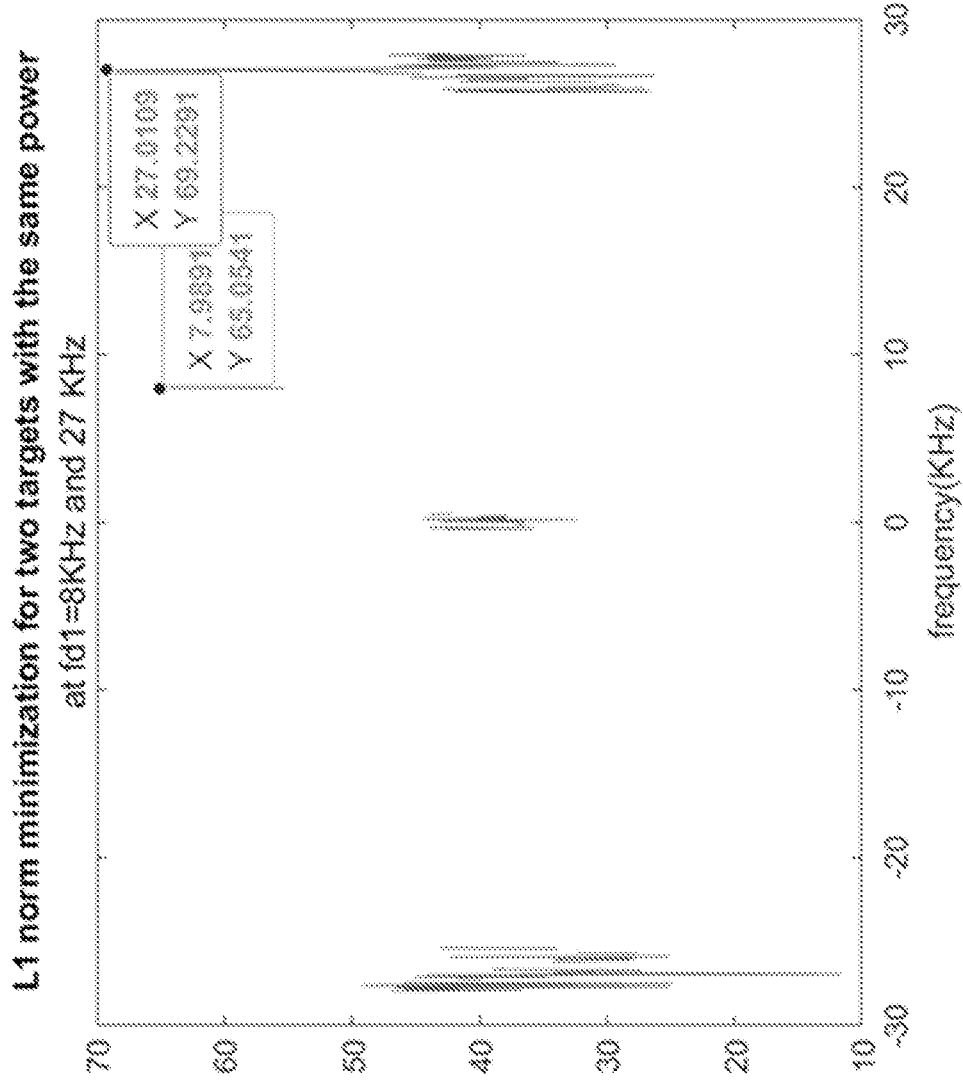
FIG. 8 is an illustrative graphical plot of an L1 normalization minimization for two targets with the same power.

Returning to FIG. 2, in some implementations, once the chirp has been transmitted (Step 210), received (Step 220), and processed via the mixer (Step 230), the system may determine an attribute of the one or more targets based on the IF and the at least one temporal characteristic (Step 240). The target attribute for each of the one or more targets may be determined using one or more normalization techniques. For example, various calculations and evaluations may be performed using one or more software architectures and/or one or more hardware architectures and discussed herein. It should be understood that the implementations disclosed herein may use the software/hardware of FIGS. 6 and 7 to carry out any viable/known method of normalization, such as for example, L2 normalization, L2 normalization with regularization technique, and/or L2 normalization with orthogonal matching pursuit technique.

In some implementations, the determination of the target variable may include determining a range of one or more targets, a Doppler of one or more targets, and/or an angle of arrival of one or more targets, as well as the reflectivity of the target. As would be understood by one of ordinary skill in the art, through determining the range, Doppler, and/or angle of arrival, the target's location at various points in time can be determined/estimated.

The detailed examples of systems, devices, and techniques described in connection with FIGS. 1-5 are presented herein for illustration of the disclosure and its benefits. Such examples of use should not be construed to be limitations on the logical process implementations of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some implementations, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The invention claimed is:

1. A phased array frequency-modulated continuous-wave (FMCW) radar system, comprising:
 a processor; and
 a memory, coupled to the processor, configured to store executable instructions, wherein the instructions, when executed by the processor, cause the processor to:
 transmit, using a plurality of antennas, a plurality of chirps, wherein each chirp within the plurality of chirps includes at least one temporal characteristic comprising identifying data identifying which of the plurality of antennas originated each of the plurality of chirps, and wherein the identifying data is pseudo-random for a portion of the plurality of chirps;
 receive, using the plurality of antennas, a plurality of chirp reflections off one or more targets;
 create, using a mixer, an intermediate frequency based on the plurality of chirps and the plurality of chirp reflections; and
 determine, based on the intermediate frequency and the identifying data, a target attribute associated with the one or more targets.

2. The system of claim 1, wherein the determination of the target attribute for each of the one or more targets utilizes one or more normalization techniques.

3. The system of claim 2, wherein the normalization techniques further comprise a technique selected from the group consisting of: L2 normalization with regularization technique and L2 normalization with orthogonal matching pursuit technique.

4. The system of claim 1, wherein the target attribute comprises a range of the one or more targets.

5. The system of claim 1, wherein the target attribute comprises a Doppler of the one or more targets.

6. The system of claim 1, wherein the target attribute comprises an angle of arrival of the one or more targets.

7. The system of claim 1, wherein the identifying data includes data corresponding to a pulse duration.

8. The system of claim 1, and wherein the identifying data is pseudo-random for all of the plurality of chirps.

9. The system of claim 1, wherein transmission of the plurality of chirps and reception of the plurality of chirp reflections have a pulse repetition interval of between $-f_{D1}$ and $+f_{D1}$.

10. A method for operating a phased array frequency-modulated continuous-wave (FMCW) radar system, comprising:
- transmitting, using a plurality of antennas, a plurality of chirps, wherein each of chirp within the plurality of chirps includes at least one temporal characteristic comprising identifying data identifying which of the plurality of antennas originated each of the plurality of chirps, and wherein the identifying data is pseudo-random for a portion of the plurality of chirps;
- receiving, using the plurality of antennas, a plurality of chirp reflections off one or more targets;
- creating, using a mixer, an intermediate frequency based on the plurality of chirps and the plurality of chirp reflections; and
- determining, based on the intermediate frequency and the identifying data, a target attribute associated with the one or more targets.

11. The method of claim 10, wherein the determination of the target attribute for each of the one or more targets utilizes one or more normalization techniques.

12. The method of claim 11, wherein the normalization techniques further comprise a technique selected from the group consisting of: L2 normalization with regularization technique and L2 normalization with orthogonal matching pursuit technique.

13. The method of claim 10, wherein the target attribute comprises a range of the one or more targets.

14. The method of claim 10, wherein the target attribute comprises a doppler of the one or more targets.

15. The method of claim 10, wherein the target attribute comprises an angle of arrival of the one or more targets.

16. The method of claim 10, wherein the identifying data includes data corresponding to a pulse duration.

17. The method of claim 10, wherein the identifying data is pseudo-random for all of the plurality of chirps.

18. The method of claim 10, wherein transmission of the plurality of chirps and reception of the plurality of chirp reflections have a pulse repetition interval of between $-f_{D1}$ and $+f_{D1}$.

* * * * *